United States Patent [19]

Kugler

[11] Patent Number: 4,807,467

[45] Date of Patent: Feb. 28, 1989

[54] DYNAMIC LOAD TEST SYSTEM FOR DRIVE UNITS

[75] Inventor: Artur Kugler, Augsburg, Fed. Rep. of Germany

[73] Assignee: Renk Aktiengesellschaft, Augsburg, Fed. Rep. of Germany

[21] Appl. No.: 70,908

[22] Filed: Jul. 8, 1987

[30] Foreign Application Priority Data

Jul. 10, 1986 [DE] Fed. Rep. of Germany ....... 3623264

[51] Int. Cl.⁴ .......................................... G01M 15/00
[52] U.S. Cl. .................. 73/118.1; 73/862.16
[58] Field of Search ........... 73/862.08, 862.09, 862.11, 73/862.14, 862.16, 117, 116, 118.1

[56] References Cited

U.S. PATENT DOCUMENTS 2,982,128  5/1961  Gibson et al. ........................ 73/117
3,712,127  1/1973  Petersen ....................... 73/862.11 X

OTHER PUBLICATIONS

Mannesmann Rexroth RV 03065/09.85, ©1985.

*Primary Examiner*—Jerry W. Myracle
*Attorney, Agent, or Firm*—Natter & Natter

[57] ABSTRACT

A dynamic load test system simulates rotating mass torque loads encountered by specimen drive units such as complete motor vehicles, internal combustion engines, transmissions, brake systems and the like. The system includes a high pressure hydrostatic pump/motor unit which is controlled and regulated as a function of the positive or negative acceleration of the test specimen. Preferably, a portion of the total flywheel mass moment of inertia required for testing the specimen is generated by actual flywheel masses while a further portion is simulated by the hydrostatic pump/motor unit or a plurality of hydrostatic units.

18 Claims, 3 Drawing Sheets

DYNAMIC LOAD TEST SYSTEM FOR DRIVE UNITS

FIELD OF THE INVENTION

The present invention relates generally to testing apparatus for components of mechanical drive units and more particularly to rotating mass simulation systems utilizing flow regulated piston driven hydrostatic pump/motor units.

BACKGROUND ART

The design and manufacture of vehicle drive systems, such as automotive drive trains, required testing of all drive system components. Among the components suited for testing have been internal combustion engines, transmissions, gears, bearings, axles, clutches, drive shafts, braking systems and combinations of such components. The term combustion engine, in the context of the present invention, should be interpreted to include gasoline engines, diesel engines and fuel-powered turbines. Prior testing devices have attempted to simulate actual running load conditions which would be experienced by the drive system specimens being tested. Realistic testing of components mandated prior testing apparatus to induce torque loads sufficient for examination of acceleration, deceleration and shifting characteristics of the specimens being examined. For such purposes, prior test systems attempted to simulate, as accurately as possible, rotating and linearly moving masses existing in a vehicle.

Among the prior rotating mass simulator test apparatus were test equipment having direct current electric drive motors controlled by electronic regulators. Such test apparatus suffered, however, from several disadvantages. Initially, they were relatively high in cost due to the cost of both the electric motors and the necessary static converters which were required for operability. In addition, because of their large mass, they occupied a considerable amount of floor space and were quite heavy. Further, rapid control of torque variation was not possible due to the high inductance of the motor windings, or, if at all possible, was achieved only at a relatively high cost. Finally, the mass moment of inertia of a typical electric motor armature was in the order of 5 to 25 times greater than the mass moment of inertia of the internal combustion engine being tested. As a result, simulation of small masses such as loads of internal combustion engines was not possible except through the sacrifice of response time and accuracy which, of course, prevented realistic load simulation.

An attempt has been made to provide testing equipment for internal combustion engines wherein, in lieu of direct current electric motors which operated as motors or generators, a hydrostatic pump/motor was employed. A typical system of this type was described in the following publication: *Mannesmann Rexroth RV 03065/09.85*, ©1985. Such test equipment was more cost effective and structurally simpler than the electric motor test apparatus. Further, the mass moment of inertia of the hydrostatic pump/motor unit was smaller than that of internal combustion engines which were being tested.

In the Rexroth system, illustrated in FIG. 3 infra, an internal combustion engine 1 was connected through a step down gearing 2 to a hydrostatic unit 3. The input speed of the hydrostatic unit 3 was coupled to an accelerator pedal through a proportional valve 4. When the engine was idling, a relatively small swivel plate pivot angle was provided by the valve 4 which resulted in a relatively small hydrostatic fluid feed volume through adjustment of the piston stroke of the hydrostatic unit. The small feed volume was sufficient to support the torque generated by the internal combustion engine at constant operating pressure of the hydrostatic fluid. The volume of hydrostatic fluid, normally oil, depended upon the rotational speed and pivot angle of the hydrostatic unit 3. When the speed increased, the delivered quantity of hydrostatic fluid increased at the same pivot angle. The torque of the engine was determined by the position of its throttle valve.

The hydrostatic unit 3, also known as a secondary unit, reacted to an increase of the engine torque through an increase of the pivot angle with the delivered hydrostatic fluid quantity becoming greater at constant speed input. The operating pressure in the system remained constant during this procedure. Such operating pressure was regulated and adjusted at a second hydrostatic unit 5. The hydrostatic unit 5, when acting as a motor, drove an electric motor 6, such as a 3-phase asynchronous motor. When the motor 6 was driven into supersynchronous speed range, it then operated as a generator and fed current back into the current supply.

When the system operated in simulation of downhill runs, the hydrostatic unit 5 operated as a pump while the first hydrostatic unit 3, i.e. the secondary unit, operated as a motor for driving the engine 1.

Among the problems encountered with such hydrostatic test system was that it was unable to realistically simulate small mass moments of inertia while providing precise regulation and adjustment of desired loads. The mass load of the system was limited by the total mass moment of inertia which could be generated at the secondary unit. Further, such system was unable to provide rapid torque load variation encountered during actual usage of the components being tested.

SUMMARY OF THE INVENTION

In compendium, the invention comprises a dynamic load test system for simulation of rotating mass loads of drive units such as complete motor vehicles, internal combustion engines, transmissions, brake systems, etc. The test system includes a hydrostatic apparatus which may include one or more hydrostatic fluid pump/motor units capable of operating as a high pressure hydrostatic pump or as a high pressure hydrostatic motor and which functions as a braking and driving load simulator. In the braking mode, the unit operates as a pump while in the driving mode, as a motor. Test loads are simulated, wholly or partly, by a rapid variation of the torque of the hydrostatic units dependent upon the acceleration mode of the test specimen. In order to regulate the delivered quantity of hydrostatic fluid, the hydrostatic unit is controlled through an electro-hydraulic control circuit with valves and servo pistons and operates preferably in a closed hydrostatic fluid cycle.

A significant feature of the invention resides in the extremely rapid variation of torque loads in the test system which is obtained by feed volume adjustment through variation of a swivel plate pivot angle. The control and regulation of the feed volume through pivot angle adjustment is achieved, in the present invention, through one or more electro-hydraulic control circuits.

To provide flywheel mass simulation, the instantaneous acceleration of the test specimen is continuously monitored, preferably at the drive train between the hydrostatic unit and the test specimen. The required simulation torque and its direction of action is determined with the use of regulator, e.g. a microprocessor or analog control circuit, and a corresponding set point signal is supplied to an electro-hydraulic control circuit which adjusts the pivot angle of a swivel plate or similar feed volume adjuster element.

The hydrostatic unit is adjusted by the regulator so that is actual torque value, i.e. electronically measured actual torque value, coninicides with the desired value; thus, the correct instantaneous torque load is applied to the test specimen.

The test system includes a microprocessor operating under a program to control the hydrostatic unit such that the static load moment of the test system can be set in such a way that at any time, the sum of static load torque plus simulation torque equals the total torque which acts upon the test specimens. The static load torque comprises the torque on an operating test specimen without any acceleration.

The test system is capable of simulating a wide range of mass moments of inertia with high precision. A first portion of the desired mass moment of inertia is generated by simulation of mass through the hydrostatic unit while a second portion of the mass moment of inertia is generated by actual flywheel masses which are selectively coupled to the hydrostatic unit.

The physical size or number of hydrostatic units required for the test system is determined by the magnitude of the mass torque to be simulated. If a major portion of the required mass can be generated in real form and in relatively small increments by flywheels, only a relatively small portion of the total mass, e.g. 10% to 25%, is required to be produced by hydrostatic simulation. As a result, only relatively small torques are required to be produced by the hydrostatic unit and the unit can be of reduced size and cost.

In addition, when rapid changes in acceleration or deceleration are required, errors due to time delays during torque regulation occur in any mass simulation. Through the use of real masses, the present invention reduces such errors because the major portion of the test system mass is due to real flywheel masses and torque regulation can be carried out more rapidly with hydrostatic units than with electric units.

From the foregoing summary, it will be appreciated that it is an aspect of the present invention to provide a dynamic load test system of the general character described which is not subject to the disadvantages of the background art aforementioned.

It is another aspect of the present invention to provide a dynamic load test system of the general character described which is relatively low in cost.

A consideration of the present invention is to provide a dynamic load test system of the general character described which provides for realistic simulation of relatively small mass moments of inertia while also providing precise regulation and adjustment of the desired load on a test specimen.

A feature of the present invention is to provide a dynamic load test system of the general character described wherein required rotating masses are realistically simulated through rapid variation of the torque of a hydrostatic pump/motor unit by programmed control of hydrostatic fluid feed volume.

Another feature of the present invention is to provide a dynamic load test system of the general character described which is capable of simulating a wide range of mass moments of inertia through selective engagement of real flywheel mass with a hydrostatic pump/motor unit.

A further aspect of the present invention is to provide a dynamic load test system of the general character described which is capable of true simulation of flywheel mass torque loads encountered during actual component usage.

A further consideration of the present invention is to provide a dynamic load test system of the general character described which is capable of providing rapid variations in torque load such as may be encountered in acceleration, deceleration and gear shifting during motor vehicle operation by utilizing real flywheel masses for generating a major portion of the torque load and hydrostatic simulation for variations.

A further feature of the present invention is to provide a dynamic load test system of the general character described which is capable of applying various torque loads to a test specimen in simulation of actual running conditions in accordance with preprogrammed test parameters.

Other aspects, features, considerations and advantages of the present invention in part will be obvious and in part will be pointed hereinafter.

With these ends in view, the invention finds embodiment in the various combinations of elements, arrangement in parts and series of steps by which the invention is achieved all or with reference to the accompanying drawings and the scope of which is more particularly pointed and indicated in the appended claims.

BRIEF DESCRIPTION OF THE DRAWINGS

In the accompanying in which are shown some of the various possible exemplary embodiments of the invention.

DESCRIPTION OF THE PREFERRED EMBODIMENTS

Figure 1:
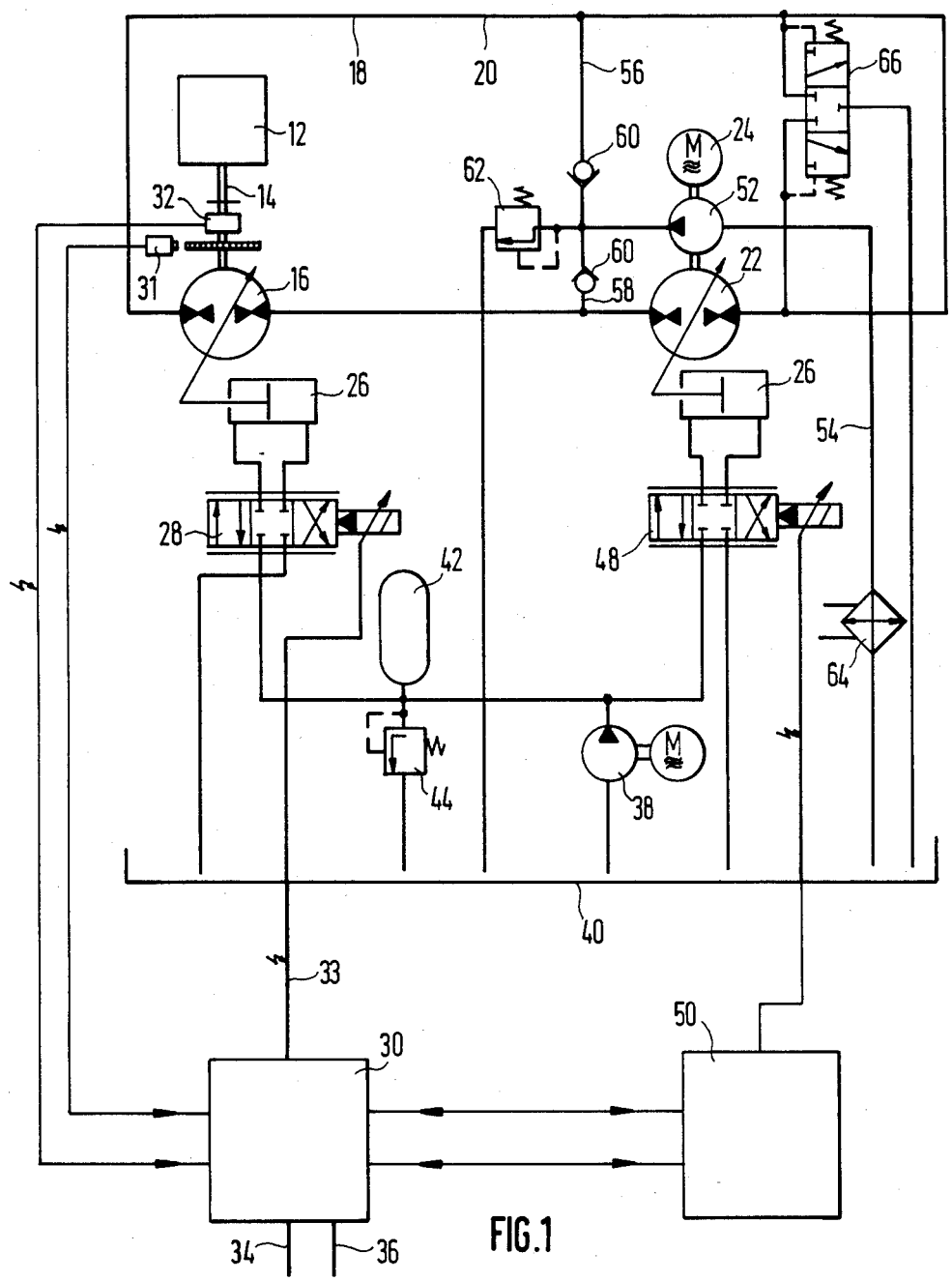
FIG. 1 is a schemetized block diagram of a dynamic load test system constructed in accordance with and embodying the invention and illustrating a hydrostatic fluid/pump motor unit controlled by an electro-hydraulic control circuit which operates as a braking and driving torque load simulator.

Referring now in detail to the drawings, a dynamic load test system is adapted to simulate rotating mass torque loads acting upon a specimen 12 during actual running operation of such specimen. The specimen 12, for example, an automotive engine, is connected through a drive shaft 14 to a hydrostatic fluid pump/motor unit 16. Hydrostatic pump/motor units are capable of operating either as high pressure hydrostatic pumps or as a high pressure hydrostatic motors, depending upon their input and output control parameters. Hydrostatic pump/motor units are piston operable machines and include known adjacent elements or controls for varying their piston stroke, hence their feed volume or fluid delivery per unit of time. Typical adjuster elements for hydrostatic units include swivel plates with adjustable pivot angles.

Accordingly, the hydrostatic pump/motor unit 16 operates as a pump or as a motor depending upon the direction of torque in the drive shaft 14. The fluid input and outputs of the hydrostatic pump/motor unit 16 are series coupled within a closed hydraulic loop or energy cycle 18. The direction of hydraulic fluid flow through the loop 18 is dependent upon the direction of rotation of the drive shaft 14 which couples the unit 16 and the specimen 12.

The hydraulic loop 18 includes a hydraulic conduit line 20 which fluid couples the hydrostatic pump/motor unit 16 and other components of the energy loop 18 such as a further hydrostatic pump/motor unit 22. The unit 22 also operates as a hydrostatic pump or as a hydrostatic motor dependent upon the magnitude of torque and flux. The two hydrostatic pump/motor units 16 and 22 operate alternately as pumps or motors, i.e. when one of the hydrostatic units operates as a pump, the other operates as a motor. The hydrostatic pump/motor unit 22 absorbs the brake energy of the hydrostatic unit 16 when the unit 16 operates as a pump and transfers such brake energy into electrical energy by driving a motor 24 which operates as a generator and feeds electric current into a power supply. Such operating state exists when the specimen 12 drives the first hydrostatic unit 16.

When the first hydrostatic unit 16 operates as a motor, driving the specimen 12, the electric motor 24 draws current from the electric power supply and drives the hydrostatic unit 22, which operates as a pump and supplies high pressure hydraulic fluid to power the first hydrostatic unit 16.

If the first hydraulic unit 16 operates only as a pump and produces brake energy for braking the specimen 12, the second hydrostatic unit 22 is not necessary. In lieu of the second hydrostatic unit 22, a pressure regulating valve, acting as a flow throttle, may be positioned in the conduit line 20. The pressure regulating valve throttles the hydraulic fluid flow to dissipate the brake energy generated.

In accordance with the present invention, the feed volume of fluid through the hydrostatic unit 16, is adjusted through a displacement cylinder 26 which engages a swivel plate to vary its pivot angle. The position of a piston within the cylinder 26 is adjustably varied by a servo valve 28 which, in turn, is controlled by a regulator 30 as a function of preset as well as variable parameters.

The regulator 30 may comprise a closed loop feedback control unit which may include a microprocessor and/or an analog control circuit. A signal indicative of the instantaneous torque at the drive shaft 14 is generated at a torque pick-up 32 and transmitted to the regulator 30. In addition, the magnitude of the mass to be simulated is preset as indicated by an input line 34. Further, a static load value which corresponds to the static load value of the system at the drive shaft 14 in the absence of acceleration or deceleration is also preset along an input line 36. The regulator 30 also receives a signal indicative of acceleration or deceleration in terms of speed variation at the drive shaft 14 through a speed pick up 31. It should also be noted that variable load values which correspond to the load values on the specimen 12 during actual usage, may be entered into the regulator 30 through an appropriate keyboard or through a separate computer.

The regulator 30 regulates an electric set point signal for the servo valve 28 which is transmitted along a control line 33. Such set point signal is generated as a function of the preset value of the mass to be simulated, the value of the static load, the instantaneous acceleration and the instantaneous torque. The servo valve 28 adjusts the pivot angle of the hydrostatic unit swivel plate through translational movement of the piston in the cylinder 26 and a mechanical linkage interconnecting the piston with the swivel plate so that the instantaneous torque load generated will comprise the static load and the torque required for the acceleration or deceleration condition being simulated.

As a result of the set point signal generated, the hydrostatic unit 16 produces a load torque corresponding to a flywheel mass to be simulated. The simulated flywheel mass may be greater or less than the mass actually present, depending upon the preset value for mass and static load which have been entered into the regulator 30 along the lines 34 and 36 respectively.

The displacement cylinder piston is operatively driven through a hydraulic fluid control line. A pump 38, powered by an electric motor, draws hydraulic fluid from a sump 40. The hydraulic fluid pressure in the control line is maintained at a constant level by a pressure relief valve 44, which empties into the sump, and a pressure accumulator tank 42. The hydraulic control line extends from the pump 38 to the servo valve 28 and pressurized fluid is supplied to the cylinder 26 under the control of the servo valve 28.

It should be noted that the hydraulic control line also extends to a second servo valve 48 which controls the supply of hydraulic fluid to a second displacement cylinder 26 associated with the hydrostatic unit 22. The piston of the second displacement cylinder is linked to the swivel plate of the second hydrostatic pump/motor unit 22 for controlling the pivot angle thereof, hence, the feed volume of the hydrostatic unit. In order to control and regulate the servo valve 48, a second regulator 50 may be employed. The regulator 50 may be similar in operation to the regulator 30 or may be operatively controlled by the regulator 30.

With attention now directed to the second hydrostatic pump/motor unit 22, the hydrostatic unit 22 drives a hydraulic pump 52 which serves to provide a pressurized hydraulic fluid supply to the hydraulic loop 18 on both sides of the hydrostatic pump/motor unit 16. The pump 52 draws hydraulic fluid from the sump 40 through an intake line 54. The output of the pump 52 extends to the conduit line 20, on opposite sides of the hydraulic pump/motor unit 16, through a pair of lines 56, 58. In each line 56, 58 a one way check valve 60 is provided. A pressure relief valve 62 is positioned between the pair of check valves 60 to maintain a constant supply pressure to the conduit line 20. The pressure relief valve 62 includes a discharge line which empties to the sump 40. A heat exchanger 64 may be provided in the intake line 54 of the pump 52. It should also be noted that both the pump 52 and the motor 24 are driven by the hydrostatic pump/motor unit 22 or the motor 24 drives both the pump 52 and the unit 22.

A flushing valve 66 is provided across the conduit line 20 for the purpose of discharging excess hydraulic fluid from the hydraulic loop 18. The valve 66 discharges into the sump 40.

It should be apparent to one of skill in the art that in lieu of utilizing a single hydrostatic pump/motor 16, several hydrostatic pump/motor units can be combined with one another and driven by the drive shaft 14. Similarly, several pump/motor units can be combined with one another in lieu of the hydrostatic pump/motor unit 22. The swivel plate pivot angles of the hydrostatic units, hence their feed volumes, can be adjusted independently of each other or simultaneously, depending upon the requirements of the test equipment and the particular environment to be replicated.

As previously mentioned, the specimen 12 may comprise an internal combustion engine, a transmission, a gear, a clutch, a brake, an axle, a drive shaft or a similar drive element. Depending upon the intended function of a specimen, it either drives various flywheel masses or is driven by flywheel masses. The hydrostatic pump/motor unit 16 serves to simulate such flywheel masses with more accuracy and follows torque variations more realistically than electric drive motor test equipment. Further, electric drive motor test equipment suffered the disadvantage of overshooting its desired value.

By utilizing hydrostatic pump/motor units, the tendency to overshoot a desired value during torque regulation is largely avoided. At high acceleration values, even hydrostatic pump/motor units generate small residual error. In accordance with the invention, the major portion of the test equipment flywheel masses to be replicated are provided by actual flywheels and only a small protion of the flywheel masses are simulated by the hydrostatic pump/motor unit. As a result, errors inherent in the magnitude of the simulated load mass, including the flywheel masses which have been provided by actual flywheels, are reduced to a negligible minimum relative to the magnitude of the total load mass under actual running conditions of the specimens.

Figure 2:
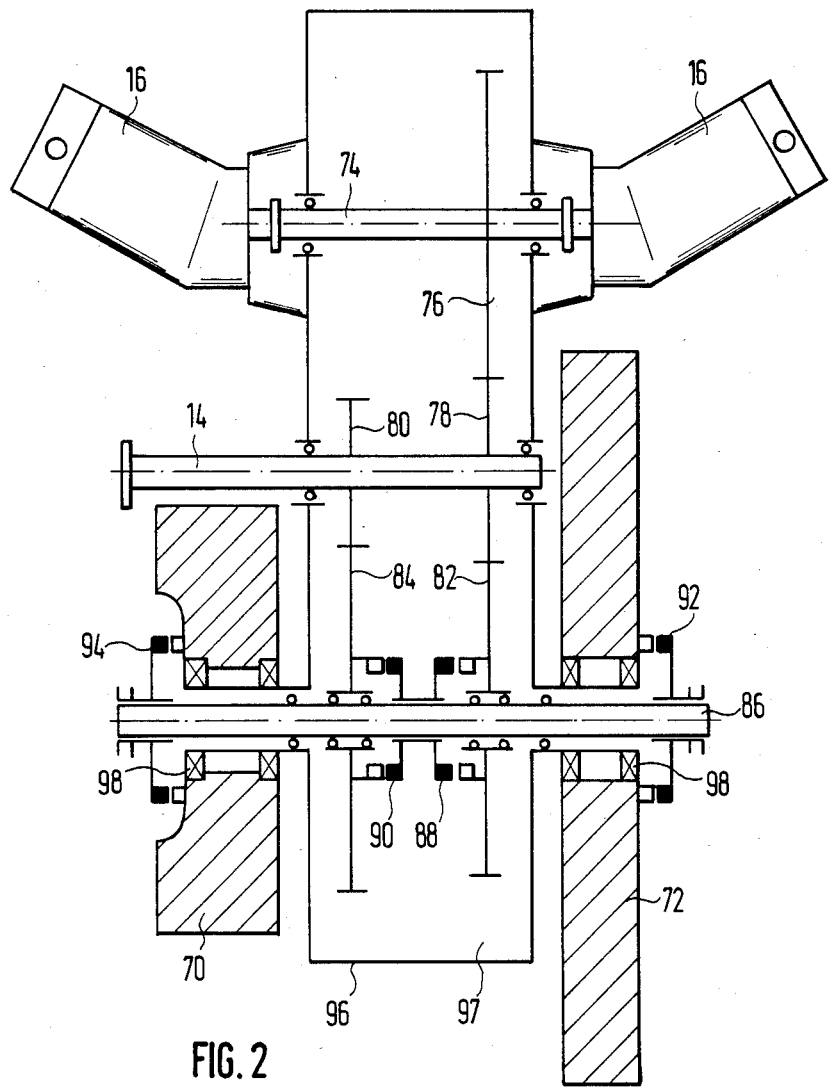
FIG. 2 is a schemetized diagram of a further embodiment of the invention wherein the test system includes a pair of hydrostatic fluid pump/motor units together with a plurality of selectively engagable flywheels.
Figure 3:
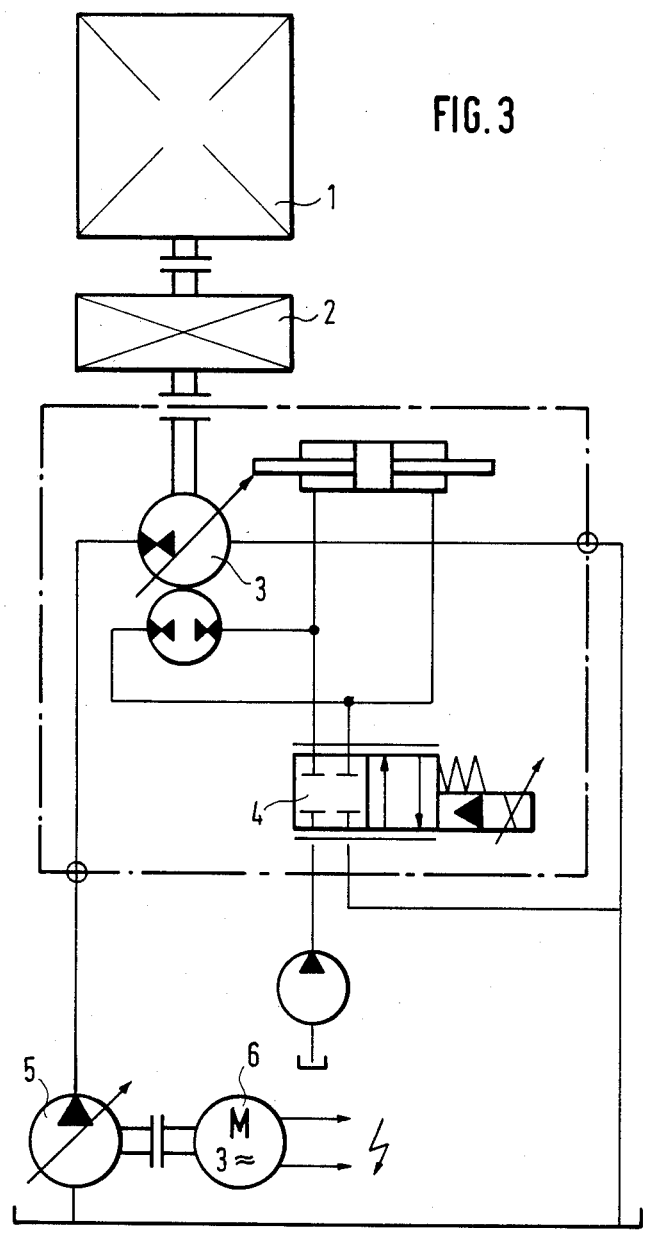
FIG. 3 is a schemetized diagram of the background art heretofore described.

With reference now to FIG. 2, wherein an alternate embodiment of the invention is shown, a dynamic load test system includes a pair of high pressure hydrostatic pump/motor units 16 which are interconnected to a test specimen through a drive shaft 14. The hydrostatic pump/motor units are coupled to a common shaft 74 having a spur gear 76. The spur gear 76 is in driving engagement with a further spur gear 78 which is fixed to the drive shaft 14. The drive shaft 14 is coupled to the test specimen as with the previous embodiment.

Pursuant to the invention, for the purpose of simulating flywheel masses existing during actual running conditions, flywheel masses in the test system are simulated by a pair of actual flywheels 70, 72.

In accordance with the type of test for the specimen, the flywheels 70, 72, together with the flywheel mass simulated by the hydrostatic pum/motor units 16, may be adjusted to be equal to, smaller, or greater than the flywheel masses existing in actual running operation and encountered by the specimen.

In lieu of the two hydrostatic pump/motor units 16 illustrated in FIG. 2, a single unit such as that described with respect to the embodiment of FIG. 1 or in the alternative, several units may be employed. The use of a plurality of hydrostatic pump/motor units instead of a single unit is advantageous in that a cost servings is effected as compared with utilizing a single hydrostatic unit of larger size. Further, multiple units provide versatility in that they can be operated simulataneously or independently. When coupled in parallel for simulataneous operation, large flywheel mass torque loads can be simulated while independent operation provides for small flywheel mass simulation.

In order to provide versatility in generating a variety of different total flywheel masses for the test system, the flywheels 70, 72 are selectively coupleable through various gearing and clutch arrangements. For such purpose, the drive shaft 14 includes, in addition to the spur gear 78, a further spur gear 80. The two gears 78, 80 have different diameters for different transmission ratios.

The gear 78 drives a pinion 82 which is rotably mounted about a connecting shaft 86. Similarly, the gear 80 is in driving engagement with a pinion 84, also rotably mounted about the shaft 86. The connecting shaft 86 is selectively engageable with the pinions 82, 84 through a pair of clutches, 88, 90 respectively. With the clutch 88 closed, the shaft 86 is driven by the pinion 82. When the clutch 90 is closed, the shaft 86 is driven by the pinion 84.

The connecting shaft 86 is placed in driving engagement with the flywheel 70 through a clutch 94 and with the flywheel 72 through a clutch 92. The flywheels 70, 72 are rotably mounted on a gear case 96 through a pair of bearings 98.

It should be now apparent that the gears 78, 80, 82, 84, on combination with the clutches 88, 90, 92 and 94 provide a two stage transmission 97. By selection of transmission shift states and clutch-flywheel engagements, a total of seven different actual flywheel masses, hence mass moments of inertia, can be effectively applied to the drive shaft 14. Such states comprise (1) engaging both flywheels 70, 72 through the gears 78, 82, (2) engaging the flywheel 70 through the gears 78, 82 (3) engaging the flywheel 72 through the gears 78, 82, (4) engaging the flywheel 72 through the gears 80, 84, (5) engaging the flywheel 70 through the gears 80, 84, (6) engaging both flywheels 70, 72 through the gears 80, 84 and (7) utilizing the basic mass of the shafts and gears with both flywheels disengaged.

Through the utilization of such various combinations of actual flywheel masses in conjunction with flywheel masses simulated by the hydrostatic pump/motor units, a substantial reduction in construction expense for flywheel mass simulation and a more precise simulation of desired flywheel mass is obtained. The particular physical size and number of hydrostatic pump/motor units to be engaged is determined by the required simulation flywheel mass and the required simulation torque. If a particular required flywheel mass can be replicated in fine graduations by actual flywheels, only a small portion, for example, 10% through 25%, of the total flywheel mass need be produced through the hydrostatic pump/motor unit. As a result, the utilization of actual flywheel masses for the simulation of flywheel masses existing during running conditions permits the use of hydrostatic pump/motor units which are not required to generate large torque values and hence are lower in cost and of reduced size.

It should be understood that the hydrostatic pump/motor units 16, illustrated in the embodiment of FIG. 2 are controlled in accordance with the electric hydraulic control circuit described with reference to the prior embodiment and are coupled within a closed hydraulic loop or energy cycle.

It should be appreciated that pursuant to the present invention, errors resulting from torque regulation delays during rapid variations of rotational speed are reduced due to the simulation of a major portion of the required flywheel mass through actual flywheels and the utilization of hydrostatic pump/motor units which provide for reduced response time as compared with electric drive motor simulation.

Thus it will be seen that there is provided a dynamic load test system which achieves the various aspects, features and considerations of the present invention which is well suited to meet the conditions of practical usage.

Since various possible embodiments might be made of the present invention and various changes may be made in the exemplary embodiments set forth herein, it is to be understood that all matters described herein or shown in the accompanying drawings should be interpreted as illustrative and not in a limiting sense.

Having thus described the invention there is claimed as new and desired to be secured by Letters Patent:

1. A dynamic load rotating mass simulating test system for examination of drive system component specimens, the test system comprising a hydrostatic unit, drive train means for operably interconnecting the hydrostatic unit and a test specimen, the hydrostatic unit including means for simulating a rotating mass torque load, means for varying the torque load applied to the specimen, the means for varying including means for rapidly varying the hydrostatic unit feed volume as a function of the instantaneous rotational acceleration of the specimen including the direction of instantaneous rotational acceleration.

2. A dynamic load rotating mass test system for testing of drive system component specimens as constructed in accordance with claim 1 wherein the hydrostatic unit comprises a high pressure hydrostatic pump/motor.

3. A dynamic load rotating mass test system for examination of drive system component specimens, the test system comprising a hydrostatic unit, drive train means for operably interconnecting the hydrostatic unit and a test specimen, the hydrostatic unit including means for simulating a rotating mass torque load, means for varying the torque load applied to the specimen, the means for varying including means for rapidly varying the hydrostatic unit feed volume as a function of the instantaneous rotational acceleration of the specimen, a hydraulic loop energy cycle, the hydrostatic unit comprising a component in the energy cycle, the means for rapidly varying the feed volume comprising a hydraulic control circuit, the hydraulic control circuit including a displacement cylinder and a piston seated within the cylinder, the hydrostatic unit including feed volume control means, means interconnecting the piston and the feed volume control means, and regulator means for adjusting the position of the piston as a function of the instantaneous rotational acceleration of the specimen to generate a desired specimen torque load, the specimen torque load including a portion in simulation of a static load on the specimen and a portion in simulation of the torque required for acceleration or deceleration of the mass load being simulated.

4. A dynamic load rotating mass test system for testing of drive system component specimens as constructed in accordance with claim 3 wherein the hydraulic loop energy cycle includes a further hydrostatic unit, the further hydrostatic unit being driven by the hydrostatic unit interconnected to the test specimen when the specimen drives the interconnected hydrostatic unit and the test system simulates acceleration torque loads on the specimen.

5. A dynamic load rotating mass test system for testing of drive system components as constructed in accordance with claim 4 wherein each hydrostatic unit comprises a hydrostatic pump/motor, the further hydrostatic unit driving the hydrostatic unit interconnected to the test specimen when the test system simulates deceleration torque loads on the specimen.

6. A dynamic load rotating mass test system for testing of drive system components as constructed in accordance with claim 5 further including motor means operatively interconected to the further hydrostatic unit.

7. A dynamic load rotating mass test system for testing drive system component specimens, the test system comprising a hydrostatic unit, drive train means for operably interconnecting the hydrostatic unit and a test specimen, the hydrostatic unit including means for simulating a rotating mass torque load, means for varying the torque load applied to the specimen, the means for varying including means for rapidly varying the hydrostatic unit feed volume as a function of the instantaneous rotational acceleration of the specimen, the system further including an actual flywheel mass, means for coupling the actual flywheel mass and the test specimen, the hydrostatic unit generating a portion of the total mass moment of inertia acting upon the specimen and the actual flywheel generating the remainder of such mass moment inertia.

8. A dynamic load rotating mass test system for testing of drive system component specimens as constructed in accordance with claim 7 wherein the actual flywheel mass is greater than the flywheel mass simulated by the hydrostatic unit, the system further including means for adjustably varying the actual flywheel mass whereby a range of flywheel masses and corresponding mass moments of inertia of various magnitudes can be simulated.

9. A dynamic load rotating mass test system for testing of drive system component speciemns as constructed in accordance with claim 7 further including at least one further actual flywheel mass and means for selectively engaging the actual flywheel masses with the test specimen.

10. A dynamic load rotating mass test system for testing of drive system component specimens as constructed in accordance with claim 9 wherein the means for selectively engaging the flywheel masses with the test specimen includes a two stage transmission and means for engaging the stages of such transmission for producing seven different flywheel mass combinations in engagement with the hydrostatic unit.

11. A dynamic load rotating mass test system for testing drive system component specimens, the system comprising hydrostatic means for simulating a rotating mass torque load, means for varying the simulated torque load, the means for varying the torque load including means responsive to the direction of instantaneous rotational acceleration of the specimen, means interconnecting the hydrostatic means and a test specimen for applying the simulated torque load to the specimen, additional rotating mass torque load means, the additional torque load means comprising at least one actual flywheel mass and means coupling the flywheel mass to the specimen for applying the additional torque load to the specimen.

12. A dynamic load rotating mass test system for testing drive system component specimens as constructed in accordance with claim 11 wherein the additional mass torque load means comprises a plurality of actual flywheel masses and means for coupling the flywheel masses to the specimen for applying additional torque load to the specimen.

13. A dynamic load rotating mass test system for testing drive system component specimens as constructed in accordance with claim 11 wherein the hydrostatic means comprises at least one high pressure pump/motor unit.

14. A dynamic load rotating mass test system for testing drive system component specimens as constructed in accordance with claim 11 wherein the additional mass torque load means provides a major portion of the total torque load applied to the specimen and the hydrostatic means provides a minor portion of the total torque load applied to the specimen.

15. A method of testing drive system components subjected to torque loads during running conditions, the method comprising the steps of:
 (a) providing a test specimen comprising a typical drive system component;
 (b) generating a rotational mass moment of inertia test load by;
  (i) providing hydrostatic means for simulation of a flywheel mass and
  (ii) providing an actual flywheel mass;
 (c) providing a torque load by interconnecting the generated mass moment of inertia with the specimen and
 (d) varying the specimen torque load by varying the simulated flywheel mass of the hydrostatic means.

16. A method of testing drive system components in accordance with claim 15 wherein the step of varying the torque load includes varying the feed volume of the hydrostatic means.

17. A method of testing drive system components in accordance with claim 15 wherein the actual flywheel mass provided constitutes a greater portion of the total mass moment of inertia than the simulated flywheel mass.

18. A flywheel load mass simulating test system for examination of drive system component specimens, the test system comprising a reversible hydrostatic unit, drive train means for operably interconnecting the hydrostatic unit and a test specimen, the hydrostatic unit including means for simulating a flywheel mass torque load, means for varying the flywheel mass torque load applied to the specimen, the means for varying including means for rapidly varying the hydrostatic unit feed volume as a function of the instantaneous positive or negative rotational acceleration of the specimen.

* * * * *